United States Patent [19]
Hoffmann

[11] Patent Number: 5,807,445
[45] Date of Patent: Sep. 15, 1998

[54] DUAL PNEUMATIC TIRE ASSEMBLY INCLUDING AIR PRESSURIZATION REGULATOR

[76] Inventor: Gottfried Hoffmann, 3116 N. Koning Dr., Sheboygan, Wis. 53083

[21] Appl. No.: 800,042

[22] Filed: Feb. 14, 1997

Related U.S. Application Data

[60] Provisional application No. 60/011,822 Feb. 16, 1996.

[51] Int. Cl.$^6$ ................................................... B60C 23/00
[52] U.S. Cl. ........................................................... 152/415
[58] Field of Search ............................................. 152/415

[56] References Cited

U.S. PATENT DOCUMENTS

| | | | |
|---|---|---|---|
| 2,251,713 | 8/1941 | Meiser | 152/415 |
| 4,872,492 | 10/1989 | McAnally et al. | 141/38 |
| 5,109,213 | 4/1992 | Williams | 340/447 |
| 5,158,122 | 10/1992 | Moffett | 141/38 |
| 5,244,026 | 9/1993 | Yasushi | 152/415 |
| 5,302,939 | 4/1994 | Downs et al. | 340/447 |
| 5,353,020 | 10/1994 | Schurmann | 340/870.31 |
| 5,491,465 | 2/1996 | Adams | 340/442 |
| 5,495,879 | 3/1996 | Cabestrero | 152/415 |
| 5,495,880 | 3/1996 | Yasushi | 152/415 |

FOREIGN PATENT DOCUMENTS

| | | |
|---|---|---|
| 0 657 312 A1 | 11/1994 | European Pat. Off. . |
| 92772 | 11/1958 | Norway . |
| 291087 | 9/1953 | Switzerland . |

*Primary Examiner*—Francis J. Lorin
*Attorney, Agent, or Firm*—Michael Best & Friedrich

[57] ABSTRACT

A dual tire assembly including a first tire defining a first interior space; a second tire defining a second interior space; and a tire pressurization assembly including a manifold having a first inlet, a first chamber communicable with the first inlet and the first interior space, a second inlet, a second chamber communicable with the second inlet and the second interior space, a by-pass passage communicating between the first and second chambers, and a flow regulator housed by the by-pass passage.

20 Claims, 3 Drawing Sheets

DUAL PNEUMATIC TIRE ASSEMBLY INCLUDING AIR PRESSURIZATION REGULATOR

RELATED APPLICATIONS

This application claims the benefit of prior filed provisional application serial no. 60/011,822 filed Feb. 16, 1996 and titled "Pressure Regulator for Dual Pneumatic Tires".

BACKGROUND OF THE INVENTION

1. Technical Field

The invention relates to the operation and maintenance of dual pneumatic tires and, more particularly, to apparatus for regulating air pressure in such tires.

2. Related Prior Art

Dual pneumatic tires are often used for trucks, air planes and other heavy duty vehicles. In many prior art arrangements, each of the tires of a dual tire assembly has its own inlet valve and is inflated or deflated individually. Because of difficult access to the inlet valves of the tires, especially to the inlet valve for the inside tire, the tires of a set of dual tires sometimes do not have the same air pressure. Also, inflation pressure differentials between the two tires can occur because of difficulty in accurately measuring the air pressures, and because tires can become heated at different rates during operation which can cause variations in tire pressure. The existence of a pressure differential can lead to different rates of tread wear of the two tires. Also, one of the tires can develop a minor leak, which can go undetected for a considerable period of time. Under such circumstances, the leaking tire gradually loses air pressure and, as a result, the other tire eventually becomes overloaded. Early breakage or bursting of the overloaded tire can then result which causes unnecessary unforeseen downtime of the equipment and unforeseen costs.

Prior art devices for inflating dual pneumatic tires have not appreciated or addressed these problems. For example, the devices disclosed by U.S. Pat. Nos. 4,872,492 and 5,158,122 are devices which are used while the tires are inflated and must be de-mounted before going to service. The general aim of these devices is to assure that during inflation the pressure of both tires is equal. But these devices fail to control the tire pressures during the most important time, i.e., while the vehicle is in service.

There also appears to be prior art devices for connecting the tires of a dual tire assembly and for adjusting pressure differentials. One example of such a device is illustrated in U.S. Pat. Nos. 5,244,026 and 5,495,880, both of which issued to Yasushi. The device disclosed by Yasushi is not, however, part of an apparatus for filling the tires. Rather, it appears to communicate between the tires only under circumstances giving rise to a pressure differential that is greater than a first, lower threshold and less than a second, higher threshold pressure differential. The Yasushi device is closed in the case of no pressure differential being present.

SUMMARY OF THE INVENTION

The invention provides an apparatus for filling a set of dual pneumatic tires and for equalizing the air pressure in each of the tires during operation. The basic principles of the present invention are as follows: It is desirable, but not necessary, to immediately equalize the air pressures within the two tires during inflation or deflation. The process to equalize the pressure can take some time. It is most important to equalize the pressure within the tires during the service of the vehicle. This equalization may become necessary because of different temperatures within the tires, different wear of the tires, etc. These changes in tire pressure do not usually occur rapidly. Therefore, the process of equalizing air pressures in the respective tires during operation may also occur gradually. In case of a small leak within one of the tires, the system should indicate to the serviceman or the driver that there is a reduction in system pressure.

In case of a sudden pressure loss caused, for example, by bursting of one of the tires or one of the hoses connecting the system with the tires, the pressure within the intact tire should, if possible, be lowered slowly in order to keep the system safe until the vehicle comes to a stop. In the least, a rapid pressure loss in one tire should not also incapacitate the second, intact tire.

By fulfilling the above requirements the invention increases operational safety, reduces tire wear, increases the operational lifetime of the tires, reduces gas consumption and, therefore, reduces overall operational costs.

The present invention provides a new, simply designed, easy to install and easy to maintain device, which is permanently connected to both of the tires using flexible hoses. In one embodiment, the invention provides tire pressurization assembly including a manifold having two inflow valves, one for each tire, and two individual air channels, one for each tire. A by-pass passage communicates between the air channels and affords a flow of air between the two tires. Within the by-pass, a flow control device controls the passage of air so that maximal flow occurs when there is a maximal pressure difference. In one embodiment, this part of the invention is a very small passage or orifice.

As soon as a pressure difference between the tires occurs, air in the relatively high-pressure tire flows through the by-pass to the lower pressure tire to regulate and equalize the pressure within the tires. With transient pressure changes, the by-pass guaranties that, while the vehicle is in use, the pressure of both tires is identical.

In case of a sudden pressure loss for any reason in one of the tires, the flow control device limits the air flow from the intact tire. In one embodiment, the flow control device permits a limited flow of air through the by-pass passage so that the intact tire deflates in a controlled manner. This allows the driver or service people to identify larger leaks or damaged tires by simply checking the flatness of the tires during stopping time of the vehicle. Instead of controlling the air flow in the by-pass by a simple hole, there are many different types of flow control elements possible, e.g. porous filter elements made from metal powder or plastics. This allows to choose the optimal flow control for the specific application. Such flow control elements do not require any movable parts and, therefore, are easy to install and do not require any maintenance for long periods of time. In an alternative embodiment, the flow control valve closes upon the occurrence of a large pressure differential of the magnitude caused by a blow-out. This type of arrangement is desirable when the factor of maintaining operation is important.

The invention also provides a tire pressurization assembly wherein the inlet valves for both tires are mounted on the outer side of the set of dual tires. Thus, access to the valves is easy and service people can readily check the pressure in the system. During inflation or deflation of the tires there is no need to exactly equalize the pressure in both tires. In a very short time after finishing the inflation or deflation of the tires, the flow control element and by-pass passage will permit the pressure in each tire to automatically equalize.

In another embodiment of the invention, the manifold has a construction permitting both of the inlet valves to be opened simultaneously by inflating the system through a single air inlet that may be used for inflation and deflation of both the tires.

In order to indicate to the driver that the pressure within the system is reduced, in one embodiment, the invention provides two pressure gages installed in the by-pass on each side of the flow control element. The system can advise the driver by showing a red LED or signal lamp that the pressure is lower than a readjusted pressure limit. For certain applications, e.g. for aircraft, it may be possible to transduce the signal to the operator panel in the vehicle. The pressure gauges operate as follows: In the event the respective tire pressures are in the optimum range, a signal would be produced by the pressure gauges.

In the event of a minor leak in one or both of the tires, the flow control element would allow the air to flow from higher pressure to lower pressure and balance the respective tire pressure. The overall system pressure would slowly decrease, and the pressure gauge which reaches the lower pressure limit first indicates the leak. The driver has no necessity to check the air pressure of all tires of the vehicle as long as the pressure gauges do not generate a signal.

In case of a larger leak, the pressure on the side of the flow control for the damaged tire would decrease rapidly. The pressure gauge would indicate not only the low pressure in the system, but also the damaged tire.

Other features and advantages of the invention will become apparent to those skilled in the art upon review of the following detailed description, claims and drawings.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Figure 1:
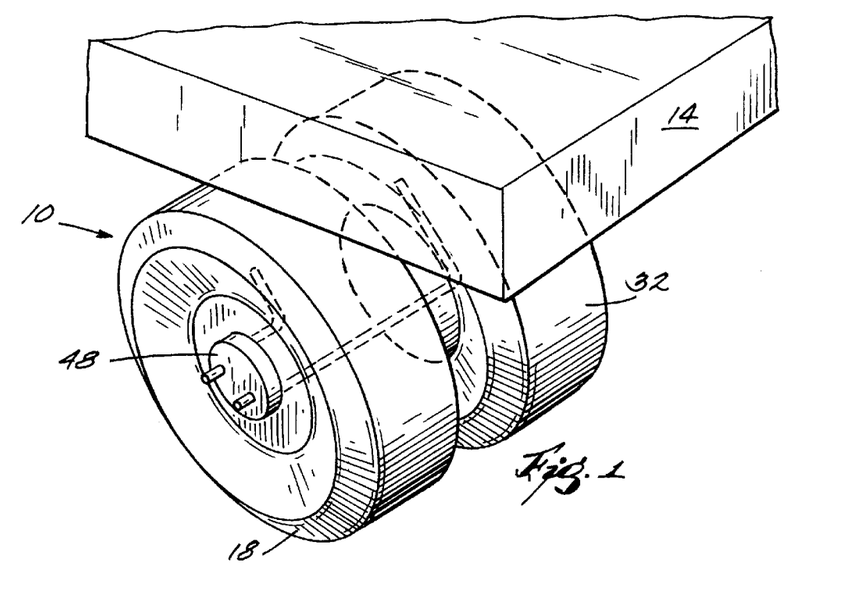
FIG. 1 is a perspective view of a portion of a vehicle including a dual pneumatic tire assembly embodying the invention.

The drawings illustrate a dual pneumatic tire assembly 10 for use with a vehicle 14 such as a truck or airplane. The dual tire assembly 10 includes a first tire 18 mounted on a first rim 20 and adapted to contain a supply of air under pressure. The interior of the tire 18 cooperates with the rim 20 to define therebetween and a first interior space 24. The rim 20 includes an inlet port 28 communicating with the interior space 24. The dual tire assembly 10 also includes a second tire 32 mounted on a second rim 36 (shown partially in phantom in FIG. 2) and adapted to contain a supply of air under pressure. The second tire 32 and the second rim 36 cooperate to define therebetween an interior space 40. The second rim 36 includes an inlet port 44 communicating with the interior space 40.

Figure 2:
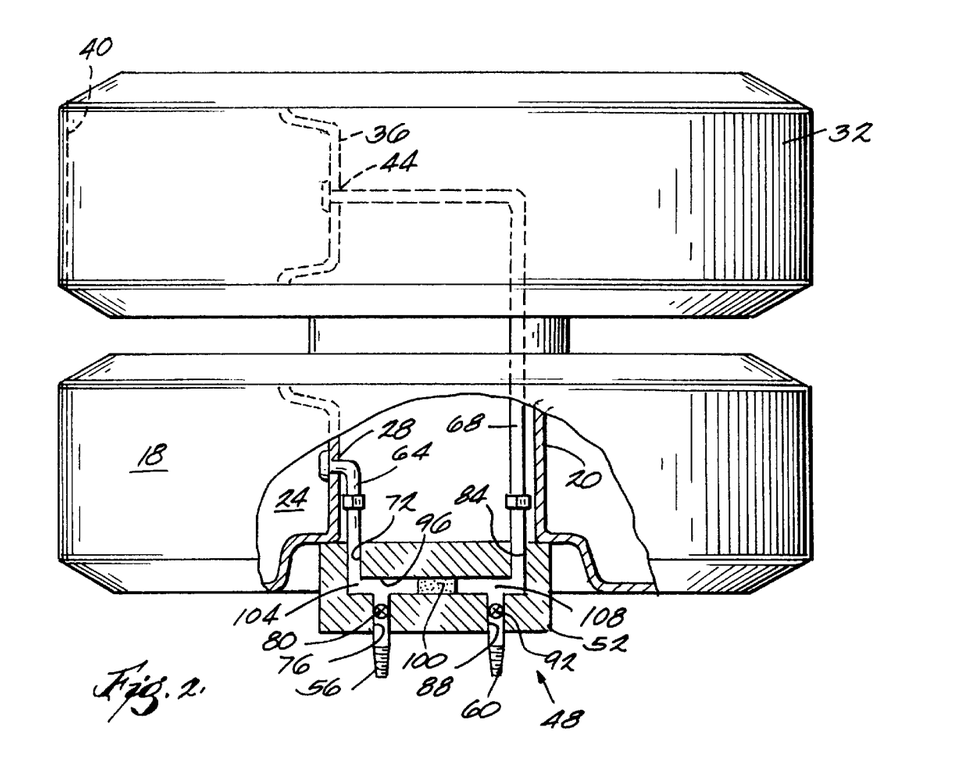
FIG. 2 is a plan view, partially broken away for the purpose of illustration, of the assembly illustrated in FIG. 1.

In order to facilitate inflation and deflation of the first and second tires 18, 32, the dual tire assembly 10 also includes a tire pressurization assembly 48. The tire pressurization assembly 48 includes a manifold 52 which is mounted on the first rim 20 so as to be facing outwardly of the dual tire assembly 10 with respect to the vehicle 14 and away from the second tire 32. In the illustrated embodiment, the first tire 18 is the "outer" tire and the second tire 32 is the "inner" tire. The manifold 52 includes a first inlet 56 and a second inlet 60. The first and second inlets 56, 60 are adapted to be operably connected to an air supply hose (not shown) for receiving a flow of air which is conducted respectively to the first and second tires 18, 32 in a manner discussed below. The tire pressurization assembly 48 also includes a first tire connector 64 communicating between the manifold 52 and the inlet port 28 in the first tire rim 20. The tire pressurization assembly 48 also includes a second tire connector 68 communicating between the manifold 52 and the inlet port 44 in the second tire rim 36.

The manifold 52 also provides several air passages and air flow control elements for conducting flows of air between the first and second inlets 56, 60 and the first and second tire connectors 64, 68 and, thereafter, to the first and second inlet ports 28, 44. More particularly, and as illustrated in FIG. 2, the manifold 52 includes a first chamber 72 communicating with the first tire connector 64. The manifold 52 also includes a first inlet passage 76 communicating between the first inlet 56 and the first chamber 72. In the embodiment of the manifold 52 shown in FIG. 2, the manifold 52 includes a first inlet valve 80 located in the first inlet passage 76 for controlling air flow introduced through the first inlet 56 into the first chamber 72. The first inlet valve 80 may be a one-way check valve, a manually operable valve that can be opened and closed, or a manually operable check valve permitting inflation by applying an air stream and deflation by manually opening the check valve.

Similarly, the manifold 52 includes a second chamber 84 communicating with the second tire connector 68, a second inlet passage 88 communicating with the second inlet 60 and a second inlet valve 92 located in the inlet passage 88 for controlling air flow therethrough. The second inlet valve 92 may also have one of the several configurations described in connection with the first inlet valve 80.

The manifold 52 also includes an intermediate or by-pass passage 96 communicating between the first and second chambers 72, 84. The tire pressurization assembly 48 also includes an air flow regulator 100 located in the by-pass passage 96 for affording flow of air between the first and second chambers 72, 84. The regulator 100 generally bisects the by-pass passage 96 into a first regulator passage portion 104 adjacent the first chamber 72 and a second regulator passage portion 108 adjacent the second chamber 84. In the embodiment of the tire pressure assembly 48 shown in FIG. 2, the air flow regulator is made of a relatively high density, porous material such as a sintered metal or plastic which provides a tortuous passage between the first regulator passage portion 104 and the second regulator portion 108. The air flow regulator 100 could also be constructed so as to provide a small hole or orifice (not shown) that affords a restricted flow of air therethrough under the influence of a pressure differential. The air flow regulator 100 does not, therefore, include any moving parts, is relatively simple to install and maintain and permits a flow of air between the first and second chambers 72, 84 in the event there exists a pressure differential between the interior spaces 24 and 40.

More particularly, the tire pressurization assembly 48 operates as follows. Beginning in a state wherein the tires 18 and 32 are underinflated, an air supply hose (not shown) can be fitted to the first inlet 56. A flow of air is introduced to the first inlet 56 and flows past the first inlet valve 80. Air flows past the first inlet valve 80 along the first inlet passage 76 and into the first chamber 72. The air flow will follow the path of least resistance into the first tire connector 64 because of the obstructing effect of the air flow regulator 100. Air thus flows through the first tire connector 64 into the first interior space 24.

During inflation of the first tire 18, some air will flow into the second regulator passage portion 108 from the first regulator passage portion 104 through the air flow regulator 100. However, the air flow regulator 100 largely restricts passage of air under such conditions, even in the presence of a large pressure differential. Once the air pressure in the first tire 18 is sufficiently high, the air supply hose (not shown) can be disconnected from the first inlet 56 and connected to the second inlet 60. Air then flows into the second inlet passage 88, past the second inlet valve 92 and into the second chamber 84. Again, because of the obstructing effect of the air flow regulator 100 the air supply will flow into the second tire connector 68 and into the interior space 40, thus inflating the second tire 32.

It is anticipated that the pressure of the first tire 18 will differ from the pressure of the second tire 32, at least initially after inflating the tires 18, 32. However, such air pressure differential will be gradually diminished by a flow of air through the air flow regulator 100 from the tire having the higher pressure into the tire having the lower pressure by way of the by-pass passage 96.

Figure 3:
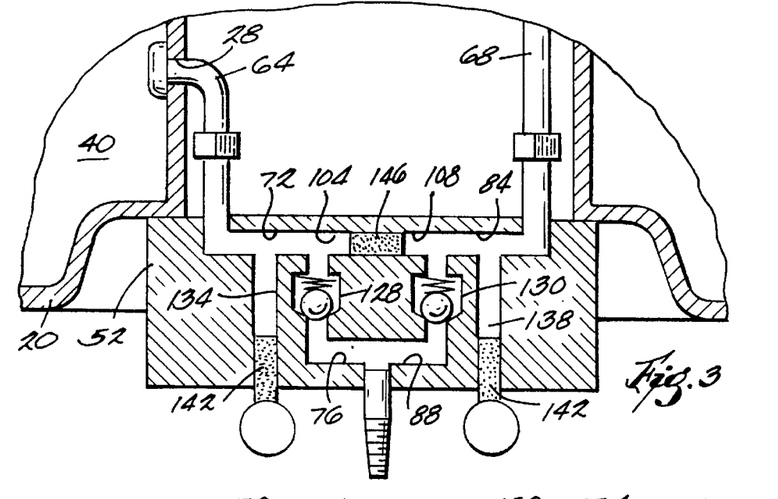
FIG. 3 is a cross-sectional view of a dual tire assembly that is an alternative embodiment of the invention.

FIG. 3 illustrates a tire pressurization assembly 120 which is an alternative embodiment of the tire pressure assembly 48. The tire pressure assembly 120 has many features that are common to the tire pressure assembly 48, however, and common features are identified by common reference numerals. The tire pressure assembly 120 includes a single, combined inlet 124 communicating with a combined inlet passage 126 which splits into the first inlet passage 76 and second inlet passage 88. The tire pressure assembly 120 includes a first inlet valve 128 in the first inlet passage 76 and a second inlet valve 130 in the second inlet passage 88. In the illustrated embodiment, the first and second inlet valves 128, 130 are in the form of one-way check valves. However, it should be readily understood that the first and second inlet valves 128, 130 could be of any suitable form, including manual valves that can be opened and closed to control the passage of air flow through the first and second inlet passages 76 and 88.

The tire pressurization assembly 120 also includes first and second chambers 72 and 84, and includes first and second regulator passage portions 104 and 108. In addition, the tire pressure assembly 120 includes a first tire pressure indicator passage 134 communicating with the first chamber 72. Similarly, the tire pressure assembly 120 includes a second tire pressure indicator passage portion 138 communicating with the second chamber 84. The tire pressure assembly 120 further includes a pair of pressure indicators 142 communicating with the indicator passages 134, 138. As will be readily apparent, the pressure indicators 142 respectively communicating with the first and second chambers 72, 84 will indicate the pressure in the respective chambers 72, 84 and, therefore, the pressure indicators will also indicate the average pressure of the tires 18, 32 i.e., the system pressure.

The tire pressure assembly 120 includes an air flow regulator 146 which is shown schematically in FIG. 3. The air flow regulator 146 can be in the form described in connection with the tire pressure assembly 48 or, alternatively, can be in the form of various mechanical air flow regulators of the type described immediately below.

Figure 4:
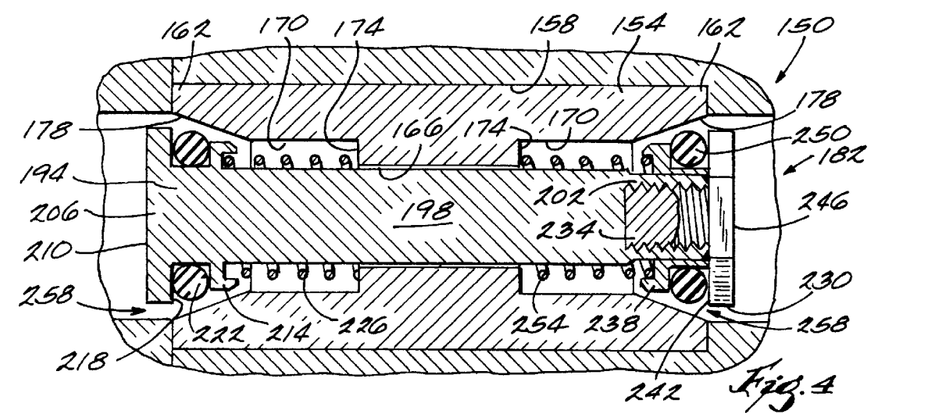
FIG. 4 is an enlarged cross-sectional view of a air flow regulator that is an alternative embodiment of the invention and that can be incorporated in the assembly shown in FIG. 1 and in the assembly shown in FIG. 3.
Figure 5:
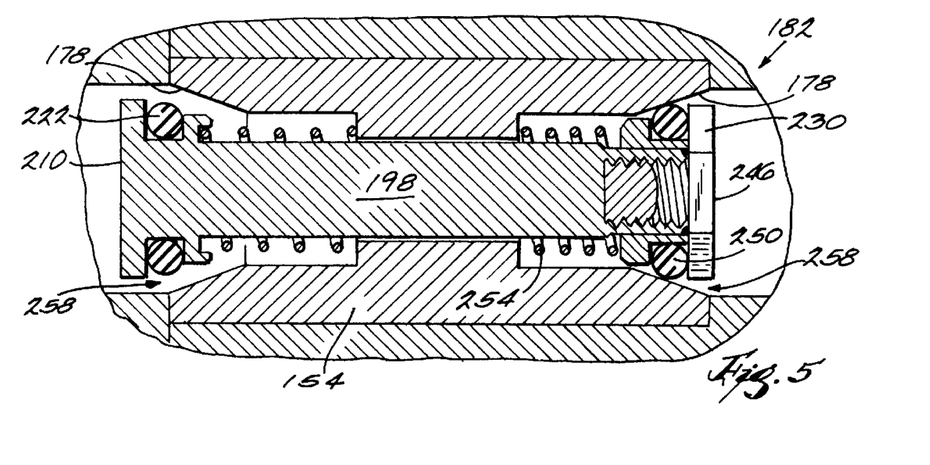
FIG. 5 illustrates the air flow regulator of FIG. 4 in a closed position.

FIGS. 4 and 5 illustrate an air flow regulator 150 that can be incorporated in either of the tire pressurization assemblies 48 and 120. The air flow regulator 150 is normally open so as to provide an air flow passage communicating between the first regulator passage portion 104 and the second regulator passage portion 108. However, the air flow regulator 150 is operable to close the air flow passage in the event air flow through the by-pass passage 96 exceeds a threshold flow rate, in which case the air flow regulator 150 prevents passage of such air flow between the first and second tires 18, 32.

More particularly, and with reference to FIG. 4, the air flow regulator 150 includes a valve body 154 which is securely housed by a recess 158 in the by-pass passage 96. The valve body 154 has opposite ends 162 and defines a bore 166 centrally located in the valve body 154 and generally communicating between the opposite ends 162. The valve body 154 is generally symmetrical about an axis (not shown) defined by the bore 166 and is also generally symmetrical about a plane (not shown) bisecting the valve body 154 and perpendicular to the axis. More particularly, each end 162 of the air flow regulator 150 includes a valve member and valve seat which can open to provide a flow passage and which can be closed to shut the flow passage.

In this regard, each end of the valve body 154 includes a counter bore 170 providing a shoulder 174. The counter bore 170 has a diameter somewhat larger than the bore 166 so that the shoulder 174 extends radially between the bore 166 and the counter bore 170. The valve body 154 also provides a frustoconical valve seat 178 which extends radially outwardly from the counter bore 170 to a respective opposite end 162 of the valve body 154.

The air flow regulator 150 also includes a valve member assembly 182 which is slidably housed by the valve body 154 for movement relative thereto. The valve member assembly 182 is moveable between a first, open position, illustrated in FIG. 4 and closed positions, one of which is illustrated in FIG. 5 and both of which are discussed in detail below.

The valve member assembly 182 includes a valve pin 194 having a shank 198 received by the bore 166. The diameter of the shank 198 is somewhat less than that of the bore 166 so as to provide a clearance between the shank 198 and the bore 166. The valve pin 194 also includes a threaded end 202 and a head 206. The head 206 provides a relatively flat, generally disc shaped pressure surface 210 that faces the first regulator passage portion 104. The valve pin 194 also includes a generally annular spring retainer 214 that extends radially outwardly from the shank 198 and that is spaced axially from the head 206. The spring retainer 214 defines a generally annular space facing the threaded end 202 of the valve pin 194 and, in cooperation with the head 206, defines an O-ring retainer 218. The valve member assembly 182 also includes an O-ring 222 held within the O-ring retainer 218 and a spring 226 having an end bearing against the spring retainer 214 and against the shoulder 174.

The valve member assembly 182 also includes an end cap 230 having an extension 234 that is generally hollow and threaded so as to receive the threaded end 202 of the valve pin 194. The threaded extension 234 defines a spring retainer 238 and cooperates with the end cap 230 to define an O-ring retainer 242. The end cap 230 also provides a generally flat, disc-shaped pressure surface 246 facing the second regulator passage portion 108.

The valve member assembly 182 also includes an O-ring 250 held by the O-ring retainer 242 and a spring 254 extending between and bearing against the spring retainer 238 and the shoulder 174 of the valve body 154 facing the end cap 230.

The components of the valve member assembly 182 are sized relative to the surfaces of the first and second regulator passage portions 104 and 108 and relative to the surfaces of the valve body 154, i.e., the valve seats 178, the counter bores 170 and bore 166, so as to provide a flow passage 258 communicating between the first regulator passage portion 104 and the second regulator pamove portion 108. The flow regulator 150 is moveable between the first or open position described above and illustrated in FIG. 4 and closed positions (one shown in FIG. 5) wherein the valve member assembly 182 is moved toward either the first regulator passage portion 104 (to the left in FIG. 4) or toward the second regulator passage portion 108 (to the right in FIG. 4). In the closed position, as shown in FIG. 5, one of the O-rings 222 or 250 engage in the valve seat 178 surrounding the ends of the valve member assembly 182 so as to close the flow passage 258. As shown in FIG. 5, the O-ring 250 sealingly engages the valve seat 178 on the side of the valve body 154 adjacent the second regulator passage portion 108. This sealing contact is a result of movement of the valve member assembly 182 toward the first regulator passage portion 104. Such movement from the open position (shown in FIG. 4) toward one of the closed positions results from the flow of air exceeding a threshold flow rate from one of the regulator passage portions 104, 108 into the other regulator passage portion as a result of pressure differential in the tires 18 and 32. Ordinarily, in the case where tire pressure differentials are zero or relatively low and below a predetermined threshold pressure differential, the flow passage 258 is open and the valve member assembly 182 is held in the open position by the counteracting forces of the springs 254 and 226. Because the springs 254 and 226 are preferably of equal spring constants, the valve member assembly 182 is held in a neutral position. However, upon the presence of a pressure differential exceeding the predetermined threshold pressure differential causing a flow of air exceeding a predetermined threshold rate of flow from one of the regulator passages into the other regulator passages, the force of the spring can be overcome to close the flow passage 258. When there exists a pressure differential that is lower than the threshold pressure differential, or other wise the flow rate is not greater than the threshold flow rate, then the valve member assembly 182 affords a flow of air therethrough, and may move slightly from the neutral or open position toward one of the closed positions, but will not close.

Figure 6:
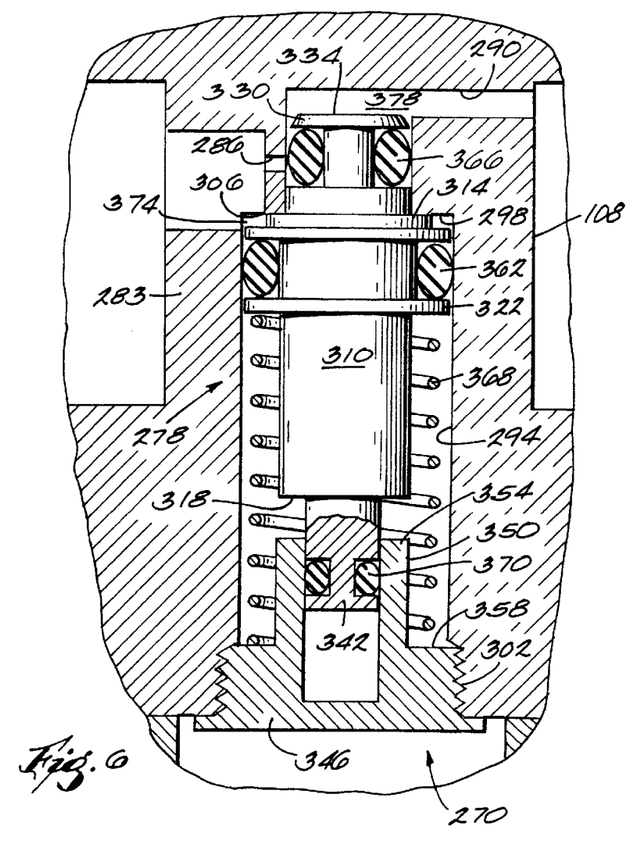
FIG. 6 is an enlarged cross-sectional view of a air flow regulator that is an alternative embodiment of the invention and that can be incorporated in the assembly shown in FIG. 1 and in the assembly shown in FIG. 3.
Figure 7:
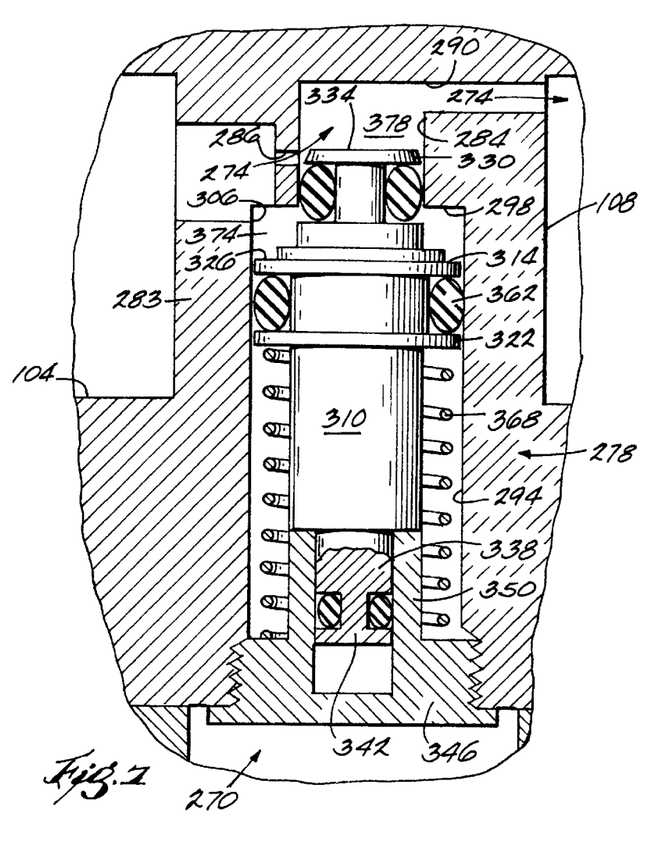
FIG. 7 illustrates the air flow regulator of FIG. 6 in an open position.

FIGS. 6 and 7 illustrate an air flow regulator 270 which can also be incorporated into the tire pressure assemblies 48 and 120. The air flow regulator 270 is also normally open under conditions when the tires 18, 32 are fully inflated, and permits communication between the first regulator passage portion 104 and the second regulator passage portion 108. However, unlike the air flow regulator 150 which depends upon tire pressure differentials between the regulator passage portions 104 and 108, i.e., the pressure of the air supplies respectively contained by the tires 18 and 32, to open and close communication between the passage portions 104 and 108, the air flow regulator 270 opens the passage between the regulator passage portions 104, 108 when the average air pressure in the passage portions 104, 108 reaches or exceeds a threshold system pressure. More particularly, and with initial reference to FIG. 7, which shows the air flow regulator 270 in an open position, a flow passage 274 is provided so as to afford fluid communication between the first and second regulator passage portions 104, 108. The air flow regulator 270 includes a valve member assembly 278 which is moveable between a first, open position (shown in FIG. 7) and a second, closed position (shown in FIG. 6) wherein the flow passage 274 is closed.

The air flow regulator 270 also includes a valve housing 283 which defines a valve housing bore 284 which houses the valve member assembly 278 for movement relative to the valve housing 283. The valve housing 283 defines the flow passage 274 by including a connector port 286 communicating between the valve housing bore 284 and the first flow regulator passage 104. The valve housing 283 also defines a connecting passage 290 communicating between the valve housing bore 284 and the second regulator passage portion 108. The valve housing 283 also defines a valve housing counter bore 294 having a diameter which is somewhat larger than the valve housing bore 284 and which defines a shoulder 298 extending radially inwardly from the counter bore 294 to the bore 284. The valve housing counter bore 294 has a threaded end 302 and communicates with the first regulator passage portion 104 by way of a second connecting port 306 located adjacent to the shoulder 298. The second connecting port is always open.

The valve member assembly 278 also includes a valve body 310 housed within the valve housing counter bore 294. The valve body 310 includes an upper shoulder 314 which faces the shoulder 298 of the counter bore 294 and a lower shoulder 318 facing the threaded end 302 of the counter bore 294. The valve body 310 also includes a first O-ring seal retainer 322 comprising a pair of radially extending discs that are axially spaced apart and that define therebetween a generally annular space. The upper shoulder 314 and first seal retainer 322 define a first pressure surface 326 that, when the valve assembly 270 is closed, is subjected only to pressure in the first regulator passage portion 104 by way of the second connecting port 306. When the valve assembly 270 is open, the first pressure surface 326 is also open to the pressures in the second regulator passage portion 108.

The valve body 310 also includes a second seal retainer 330 that extends from the upper shoulder 314 of the valve body 310 into the valve housing bore 284. The axial end of the second seal retainer 330 provides a generally flat disc-shaped second pressure surface 234 and defines a generally annular space which retains a second seal in the manner discussed below.

The valve body 310 also includes a valve body guide pin 338 extending from the lower shoulder 318. The valve body guide pin 338 has a diameter that is generally cylindrical and has a diameter that has less than that of the valve body 310. For the purposes of guiding the valve body 310 between the open and closed positions, the valve body guide pin 338 provides a guide seal retainer 342 and retains a valve body guide seal in the manner discussed below.

The valve member assembly 278 also includes an end cap 346 which is threaded into the threaded end 302 of the valve housing counter bore 294. The end cap 346 includes a valve body guide 350 extending inwardly of the counter bore 294. The distal end of the valve body guide 350 provides a generally annular valve body guide stop 354 and, radially outwardly of the valve body guide stop 354 a generally annular end cap spring stop surface 358.

The valve member assembly 278 also includes a first seal 362 located in the first seal retainer 322, a second seal located in the second seal 366 retainer 330 and a valve body guide seal 370 retained by the valve body guide seal retainer 342. The first seal 362 sealingly engages the sides of the counter bore 294 and the valve body 310 to prevent flow of air past the first seal 362. The second seal 366 sealingly engages the side walls of the valve housing bore 284 and the second seal retainer 330 to prevent the passage of air thereby. The valve member assembly 278 also includes a spring 368 which surrounds the valve body 310 and is housed by the valve housing counter bore 294. The spring 368 has an end engaged with the first seal retainer 322 and an end engaged with the end cap spring stop surface 358 so as to bias the valve body 310 toward the closed position.

The valve member assembly 278 thus provides a first pressure chamber 374 located between the first and second seals 362, 366 and communicating between the first regulator passage portion 104 by way of the second connecting port 306. The air flow regulator 270 also provides a second pressure chamber 378 located above the second pressure surface 354. The second pressure chamber 278 communicates with the second regulator passage portion 108 and is separated from the first pressure chamber 374 by the second seal 366. As discussed below, the first and second pressure chambers 374, 378 communicate by way of the connecting port 286 and the connecting port 306 when the valve member assembly 278 is moved into the open position.

The air flow regulator 270 operates as follows: in an initial state wherein the pressure in the first tire 18 and, therefore, the pressure in the first regulator passage portion 104 is below a threshold pressure, and wherein the air pressure of the second tire 32 and, therefore the second regulator passage portion 108, is below a threshold pressure, the system is considered to be in an underinflated state. In such an underinflated state, the air flow regulator 270 is in a closed position wherein the flow passage 274 is closed. More particularly, and in reference to FIG. 6, the flow passage 274 is closed by the second seal 366 which is moved into engagement with the valve housing bore 284 at a point intermediate the connecting port 286 and the connecting passage 290. In this closed position, the valve member assembly 278 prevents fluid communication between the first and second regulator passage portions 104, 108. Also, the first regulator passage portion 104 can not communicate or act upon the second pressure surface 334; only pressure in the second regulator passage portion 108 can act on the second pressure surface 334. The first pressure surface 326 does communicate with the first regulator passage portion 104, however by way of the second connecting port 306. The valve member assembly 278 is moved or biased to the closed position by the spring 368.

In the closed position, the upper shoulder 314 of the valve body 310 engages the shoulder 298 of the valve housing counter bore 294 so as to limit travel of the valve member assembly toward the closed position.

Upon pressurization of the interior spaces 24 and 40 above a threshold system pressure such that the average pressure acting on the first and second pressure surfaces 326 and 334 exceeds a predetermined average system pressure, then the valve member assembly 278 will be biased away from the first, closed position toward an open position (downward in FIG. 7). More particularly, if a system pressure is selected, the sizes of the first and second pressure surfaces 326 and 334, as well as the force of spring 368 can be selected so as to permit movement of the valve member assembly 328 from the closed position to the open position when the system pressure reaches or exceeds the threshold pressure. For example, such a threshold pressure could be set at 90 psi. Once the system pressure reaches the threshold pressure in both the first regulator passage portion 104 and the second regulator passage portion 108, thereby acting on both the first pressure surface 326 and the second pressure surface 334, the pressure on the first and second pressure surfaces 326, 334 is sufficient to overcome the spring force of spring 368. If, however, the pressure in only one of the interior spaces 24, 40 reaches the threshold pressure, e.g., 90 psi, but the other of the interior spaces does not reach 90 psi, then the average system pressure will not be great enough to open the air flow regulator 270, i.e., move the valve member assembly 278 away from the closed position to afford communication between the tires 18 and 32. Rather, for example, if the pressure in the first regulator passage portion is 90 psi, such pressure will act on the first pressure surface only by way of the second connecting port 306. Because the valve member assembly 278 is in the closed position, the first regulator passage portion 104 does not act on the second pressure surface 334. Because the pressure in the first regulator portion 104 acting only on the first pressure surface area 326 is not great enough to overcome the spring force, the valve member 310 will remain seated in its closed position. Upon pressurization of the second tire 32, however, pressure in the second regulator passage portion 108 will act on the second pressure surface 334, thereby providing enough force to overcome the spring force and move the valve member assembly (downwardly in FIG. 7) away from the first position toward an open position.

Movement of the valve member assembly 278 away from the closed position toward the open position is limited by the range of motion permitted by the valve body guide stop 354 and the lower shoulder 318 of the valve body 310. As mentioned above, the valve body guide seal 370 engages the valve body guide 350 so as to afford sliding movement of the valve body 310 relative to the valve housing 283.

When the valve member assembly 278 is moved into its open position, the full passage 274 is open and affords equalization of pressure differentials between the first and second regulator passage portions 104 and 106, provided the system pressure remains above the threshold system pressure. If, however, the system pressure drops below the threshold system pressure, then there will be insufficient force on the pressure surfaces 326 and 334 to overcome the spring force of spring 368 thereby permitting the valve member assembly 278 to move back toward the closed position and close the flow passage 274. Such closing of the flow regulator 270 can occur either in the event of a slow leak in either of the tires 18, 32 or elsewhere in the dual tire assembly 10, or in the event of a rupture of either of the tires 18, 32 resulting in a rapid depressurization of the dual tire assembly.

Various features of the invention are set forth in the following claims.

I claim:

1. A dual tire assembly comprising:
   a first tire defining a first interior space;

a second tire defining a second interior space;

a tire pressurization assembly including a manifold having a first inlet, a first chamber communicable with the first inlet and the first interior space, a second inlet, a second chamber communicable with the second inlet and the second interior space, a by-pass passage communicating with the first chamber intermediate the first inlet and the first interior space and communicating with the second chamber intermediate the second inlet and the second interior space, and an air flow regulator housed by the by-pass passage.

2. A dual tire assembly as set forth in claim 1 wherein the by-pass passage affords communication of a flow of air between the first interior space and the second interior space, and wherein the air flow regulator restricts passage of the flow of air through the by-pass passage.

3. A dual tire assembly as set forth in claim 1 and wherein the tire pressurization assembly further includes a first inlet passage communicating between the first inlet and the first chamber and a first inlet valve in the first inlet passage.

4. A dual tire assembly as set forth in claim 1 and further including a first rim, the manifold being mounted on the first rim.

5. A dual tire assembly as set forth in claim 4 and further including a second rim, the first tire being mounted on the first rim and the second tire being mounted on the second rim, the manifold being mounted on the first rim in a position facing away from the second rim.

6. A dual tire assembly as set forth in claim 1 wherein the by-pass passage affords communication of a flow of air between the first interior space and the second interior space, and wherein the flow regulator is operable to move between an open position permitting flow through the by-pass passage and a closed position wherein the flow regulator prevents passage of air flow through the by-pass passage.

7. A dual tire assembly as set forth in claim 6 wherein the flow regulator is normally open.

8. A dual tire assembly as set forth in claim 7 wherein the first tire is adapted to contain a supply of air under pressure at a predetermined system pressure, wherein the second tire is adapted to contain a supply of air at the predetermined system pressure, and wherein when the first and second tires contain respective air supplies at the predetermined system pressure, the flow regulator is in the open position.

9. A dual tire assembly as set forth in claim 1 wherein the first tire is adapted to contain a supply of air under pressure at a predetermined system pressure, wherein the second tire is adapted to contain a supply of air at the predetermined system pressure, and wherein when the first and second tires contain respective air supplies at the predetermined system pressure, the flow regulator is in the open position.

10. A dual tire assembly comprising:

a first tire defining a first interior space;

a first inlet passage having a first end communicating with the first interior space and having a second end;

a second tire defining a second interior space;

a second inlet passage having a first end communicating with the second interior space and having a second end;

a pair of check valves respectively located at the second ends of the first and second inlet passages, said check valves being respectively and independently movable between an open Position wherein the check valves afford respective flows of air through the first and second passages to the first and second interior spaces; and a flow regulator defining a flow passage communicable between the first and second passages for conducting therethrough a flow of air, the flow passage having a first end communicating with the first passage intermediate the first and second ends of the first passage, and the flow passage having a second end communicating with the second passage intermediate the first and second ends of the second passage, the flow regulator having a valve housing defining a bore, a valve member housed in and supported by the bore for movement between an open position wherein the flow passage is open and the valve member affords passage of a flow of air through the flow passage and a first closed position wherein the flow passage is closed and the valve member prevents flow of air through the flow passage, the flow regulator providing a first pressure surface exposed to pressure in the first passage and providing a second pressure surface exposed to pressure in the second passage, the valve member being in the open position when the pressure differential acting on the first and second pressure surfaces is between zero and a threshold pressure, and the valve member being in the closed position when the pressure differential exceeds the threshold pressure.

11. A dual tire assembly as set forth in claim 10 and further including a manifold housing the flow regulator, wherein the manifold defines a first chamber, the first chamber communicating with the first passage, and wherein the manifold defines a second chamber, the second chamber communicating with the second passage.

12. A dual tire assembly as set forth in claim 11 wherein the flow passage is communicable between the first and second chambers.

13. A dual tire assembly as set forth in claim 10 wherein the flow regulator is moveable from the open position to the first closed position wherein the flow passage is closed and from the open position to a second closed position opposite the first closed position wherein the flow passage is closed.

14. A dual tire assembly as set forth in claim 13 wherein the flow regulator includes a first spring biasing the valve member toward the first closed position and a second spring biasing the valve member toward the second closed position.

15. A dual tire assembly comprising:

a first tire defining a first interior space;

a second tire defining a second interior space; and a tire pressurization assembly including a manifold having a first inlet, a first valve in the first inlet, a first chamber communicable with the first inlet and the first interior space, a second inlet, a second valve in the second inlet, a second chamber communicable with the second inlet and the second interior space, a by-pass passage communicating between the first and second chambers, the by-pass passage communicating with the first chamber intermediate the first inlet and the first interior space and communicating with the second chamber intermediate the second inlet and the second interior space, and a flow regulator having a valve housing defining a bore communicating with the by-pass passage, a valve member housed and supported by the bore for movement between an open position wherein the by-pass passage is open and affords passage of a flow of air through the by-passage between the first and second interior spaces and a closed position wherein the by-pass passage is closed and prevents flow of air through the by-pass passage, the flow regulator providing a first pressure surface exposed to pressure in the first passage and providing a second pressure surface exposed to pressure in the second passage, the valve member being in the open position when the pressure in the first and second passages exceeds a predetermined threshold pressure and the valve member moving into the closed position when the pressure in either the first passage or the second passage falls below the predetermined threshold pressure.

16. A dual tire assembly as set forth in claim 15 wherein the flow regulator provides a first pressure chamber that is within the valve housing and that communicates with the first passage.

17. A dual tire assembly as set forth in claim 16 wherein the flow regulator provides a second pressure chamber defined, in part, by the second pressure surface, and wherein the first pressure chamber and the second pressure chamber do not communicate when the valve member is in the closed position.

18. A dual tire assembly as set forth in claim 15 wherein the flow regulator includes a spring housed by the valve housing and wherein the valve member is biased toward the closed position by the spring.

19. A dual tire assembly as set forth in claim 15 wherein the valve member defines, in part, the first pressure surface, and defines, in part, the second pressure surface.

20. A dual tire assembly as set forth in claim 15 wherein the valve housing includes a counter bore shoulder, wherein the valve member includes an annular shoulder engageable with the counter bore shoulder, and wherein the movement of the valve member toward the closed position is limited by engagement by the counter bore shoulder and the annular shoulder on the valve member.

\* \* \* \* \*

UNITED STATES PATENT AND TRADEMARK OFFICE
CERTIFICATE OF CORRECTION

PATENT NO.  : 5,807,445
DATED       : September 15, 1998
INVENTOR(S) : Gottfried Hoffmann It is certified that error appears in the above-identified patent and that said Letters Patent is hereby corrected as shown below:

Column 7, line 26, "pamove" should be --passage--.

Signed and Sealed this

Sixth Day of April, 1999

Attest:

Attesting Officer

Q. TODD DICKINSON

Acting Commissioner of Patents and Trademarks